United States Patent [19]

Fabbri

[11] 4,366,610

[45] Jan. 4, 1983

[54] DEVICE FOR INSERTING BARS INTO TUBES

[75] Inventor: Vladimiro Fabbri, Faenza, Italy

[73] Assignee: I.E.M.C.A. S.p.A. Industria Elettromeccanica Complessi Automatici, Faenza, Italy

[21] Appl. No.: 187,278

[22] Filed: Sep. 15, 1980

[30] Foreign Application Priority Data

Sep. 28, 1979 [IT] Italy ................ 3494 A/79

[51] Int. Cl.³ ............................................. B23P 19/04
[52] U.S. Cl. ......................................... 29/234; 29/237
[58] Field of Search ................... 29/234, 237, 282; 254/29 R

[56] References Cited

U.S. PATENT DOCUMENTS

| 2,426,401 | 8/1947 | Mack | 29/234 |
| 3,483,607 | 12/1969 | Madden | 254/29 R |
| 3,639,967 | 2/1972 | Brighton | 254/29 R |

FOREIGN PATENT DOCUMENTS 850589 9/1952 Fed. Rep. of Germany ........ 29/234

Primary Examiner—James L. Jones, Jr.
Attorney, Agent, or Firm—Guido Modiano; Albert Josif

[57] ABSTRACT

The invention relates to a device for inserting bars into a tube, in particular the so-called bar guide tube of a lathe. The device comprises a carriage mobile parallel to a guide arranged to support a bar in a position aligned with the tube. The carriage is provided with an appendix which intersects the guide, such that during a first stroke of the carriage, said appendix thrusts against the rear end of the bar in such a manner that this latter becomes partly inserted into the tube. The carriage also comprises a bar thrust rod mounted mobile relative thereto so that it can be disposed along the guide and aligned with the bar, so that the bar becomes completely inserted into the tube during a second stroke of the carriage.

5 Claims, 4 Drawing Figures

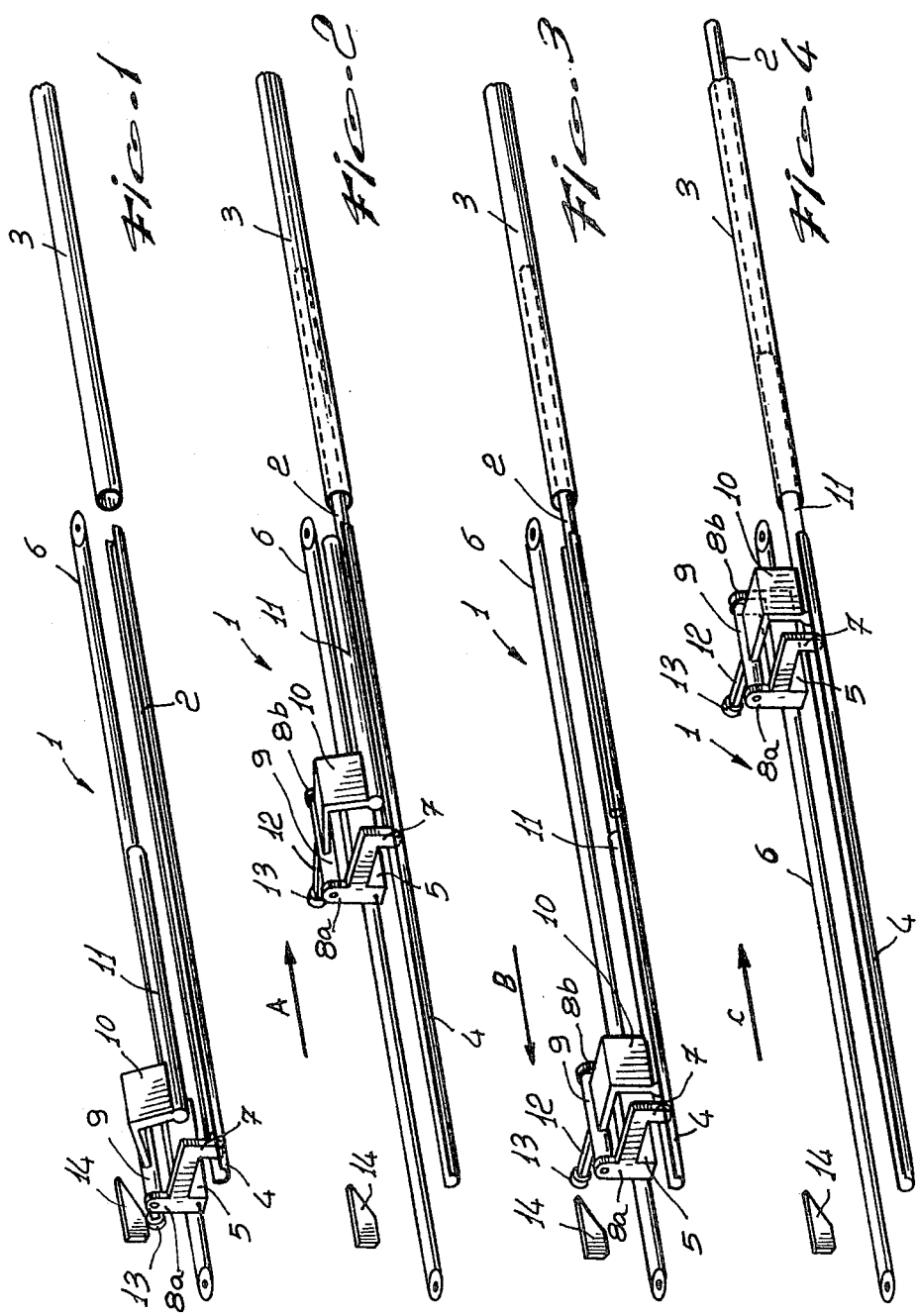

4,366,610

DEVICE FOR INSERTING BARS INTO TUBES

BACKGROUND OF THE INVENTION

This invention relates to a device for inserting bars into tubes, in particular bar guide tubes of lathes.

In the mechanical machining field it is known to mass-produce mechanical pieces on a lathe starting from bars. In the case for example of multi-spindle lathes, the bar has to be inserted into a guide bar tube on the machine, which then successively feeds the bar. The bars, taken from a store and deposited on a guide axially to the guide bar tube, are inserted into this latter by a so-called bar thrust device which is operated by a drive system, for example of the chain type.

The bar thrust device, which is disposed behind the bar and along the axis thereof, is often of considerable length, as in most cases it is required to move the rear end of the bar considerably beyond the rear end of the tube. The total length of the device, represented, in practice, by the sum of the lengths of the bar and bar thrust device, is consequently generally considerable, this drawback being aggravated by the fact that the device is disposed longitudinally to the machine tool, i.e. in the direction of its maximum length. In many cases, this prejudices its installation.

SUMMARY OF THE INVENTION

The present invention sets out to eliminate this drawback by providing a device for inserting bars into tubes, which is of a considerably reduced overall length than conventional types, while enabling the rear end of the inserted bar to be moved to a considerable degree into the guide tube.

Within this aim it is possible to arrange that the device for inserting bars into tubes is of simple design, versatile use and economical cost, so that production is made advantageous in all senses.

According to one aspect of the present invention there is provided a device for inserting bars into tubes, comprising a carriage mobile to and fro in a direction parallel to a guide arranged for supporting a bar in a position aligned with the tube, characterized in that said carriage is provided with an appendix which intersects the guide, such that during a first active stroke of the carriage, said appendix thrusts against the rear end of the bar in such a manner that this latter becomes partly inserted into the tube, and comprises a bar thrust rod which is mounted mobile on the carriage in such a manner that it can be disposed along the guide and aligned with the bar, so that the bar becomes completely inserted into the tube during a second active stroke of the carriage, means being provided at the rear end of the device for raising the bar thrust rod from the guide in order to enable a subsequent bar to be fed into the guide.

BRIEF DESCRIPTION OF THE DRAWING

The characteristics of the present invention will be more apparent from the detailed description of a preferred embodiment of the device for inserting bars into tubes, illustrated by way of example in the accompanying drawing, in which:

FIG. 1 is a partly diagrammatic perspective view of the device in its initial position;

FIG. 2 shows the same view of the device during the first stroke of the carriage;

FIGS. 3 and 4 show the same view of the device in the initial and final position of the second stroke of the carriage respectively.

DESCRIPTION OF THE PREFERRED EMBODIMENTS

With reference to said figures, the reference numeral 1 indicates overall the device according to the invention for inserting bars 2 into a tube 3, in particular a bar guide tube for example of a multi-spindle lathe. The bars 2 are fed one-by-one in succession from a suitable store, not shown on the drawing, into an upwardly open guide 4 disposed in alignment with the tube 3. The device 1 comprises substantially a carriage 5 which is mobile parallel to the guide 4 in opposing directions in operating a drive system 6, for example of the chain type. Stop means of known type, comprising electrical contacts or the like, enable the carriage 5 to be automatically halted at predetermined points. The carriage 5 comprises a flat appendix 7 of angular profile, which extends transversely to the axis of motion of the carriage towards guide 4 such that its end intersects the guide, and is slidable along it when the carriage moves.

The carriage 5 also upperly comprises a pair of expansions 8a, b, between which a pin 9 is rotatably mounted with its axis parallel to the axis of the guide 4. A bar thrust rod 11 with its axis parallel to the axis of the guide 4 is fixed on one side of the pin 9 by means of a bracket 10. The bar thrust rod 11 is therefore rotatable with the pin 9, in such a manner that when the bar 2 is absent, said rod can lie by gravity inside the guide 4 to the front of the carriage appendix 7, i.e. on that side of said appendix 7 which faces the tube 3. The rod 11 is fixed to the bracket 10 at its rear end so that the rod can be inserted almost over its entire length into the tube 3.

A stem 12 for supporting a roller 13 is fixed transversely to the pin 9 on the opposite side to the bracket 10. The roller 13 is arranged to engage, at the rear end of the device, a stationary cam 14 designed to lift the bar thrust rod 11 from the guide 4. The operation of the device for inserting bars into tubes is as follows. As shown in FIG. 1, the carriage 5 is initially at the rear end of the device where the cam 14, by engaging the roller 13, keeps the bar thrust rod 11 lifted. A bar 2 can therefore be introduced into the guide 4.

When the carriage 5 is moved in the direction of the arrow A of FIG. 2 by the drive system 6, the bar 2 is urged towards the mouth of the tube 3 by the carriage appendix 7. During this first active stroke, the bar thrust rod, which is free from its engagement with the cam 14, descends to rest on the bar 2.

After passing through a predetermined path, which is of length greater than the length of the bar thrust rod 11, the carriage 5 is halted and reverses its movement, while the bar 2 remains at rest in the attained position of partial insertion into the tube 3. During the carriage return stage (arrow B of FIG. 3), the bar thrust rod 11 slides on the bar 2 and at the end falls into the guide 4 to lie on the same axis as the bar.

The carriage 5 now stops before the cam 14, and its direction of movement is again reversed (arrow C of FIG. 4). During this second active stroke, the bar thrust rod 11 inserts the bar deeply into the tube 3.

This depth can be chosen in relation to the length of the rod. When the bar is reached its predetermined position, the carriage 5 returns to its initial position for the insertion of a new bar.

It is therefore apparent that the device according to the invention has an overall length which is substantially reduced relative to conventional types.

This length is necessarily only slightly greater than the length of the bar to be inserted. In spite of this, because of the double stroke of its carriage, the device enables the rear end of the bar to be inserted to a considerable extent into the bar guide tube.

The materials, shapes and dimensions of the device can be chosen at will according to requirements. Moreover, all details can be replaced by others technically equivalent.

I claim:

1. A device for inserting bars into tubes, comprising a carriage mobile to and fro in a direction parallel to a guide arranged for supporting a bar in a position aligned with the tube, characterized in that said carriage is provided with an appendix which intersects the guide, such that during a first active stroke of the carriage, said appendix thrusts against the rear end of the bar in such a manner that this latter becomes partly inserted into the tube, and comprises a bar thrust rod which is mounted mobile on the carriage in such a manner that it can be disposed along the guide and aligned with the bar, so that the bar becomes completely inserted into the tube during a second active stroke of the carriage, means being provided at the rear end of the device for raising the bar thrust rod from the guide in order to enable a subsequent bar to be fed into the guide.

2. A device as claimed in claim 1, characterized in that said bar thrust rod is fixed rigidly to a pin mounted rotatable axially on said carriage with its axis parallel to the carriage feed axis and parallel to the axis of said rod.

3. A device as claimed in claim 1, characterized in that said bar thrust rod is disposed to the front of said carriage appendix, with reference to the direction in which the carriage moves towards the tube, said appendix being flat transversely to said guide.

4. A device as claimed in claim 1, characterized in that said means for raising the bar thrust rod comprise a cam arranged to act on a stem transverse to said pin, to cause it to rotate.

5. A device as claimed in claim 1, characterized in that it comprises a system for driving said carriage parallel to said guide in opposing directions, means being provided for halting the carriage in predetermined positions at the beginning and end of the said two active feed strokes of the bar.

* * * * *